(12) United States Patent
Tang

(10) Patent No.: US 6,950,237 B2
(45) Date of Patent: Sep. 27, 2005

(54) FIBER BASED FIELD EMITTER DISPLAY

(76) Inventor: Yin S. Tang, 201 Rockview, Irvine, CA (US) 92612

( * ) Notice: Subject to any disclaimer, the term of this patent is extended or adjusted under 35 U.S.C. 154(b) by 40 days.

(21) Appl. No.: 10/775,793

(22) Filed: Feb. 9, 2004

(65) Prior Publication Data

US 2005/0152042 A1    Jul. 14, 2005

Related U.S. Application Data

(63) Continuation-in-part of application No. 10/754,365, filed on Jan. 8, 2004.

(51) Int. Cl.[7] .......... G02B 27/10; G02B 6/04; C03B 37/023
(52) U.S. Cl. .......... 359/619; 385/115; 65/385
(58) Field of Search .......... 359/618–620, 359/626; 385/115, 116, 120; 264/1.32, 1.34, 264/2.6; 65/433, 385

(56) References Cited

U.S. PATENT DOCUMENTS

| | | | | | |
|---|---|---|---|---|---|
| 3,582,297 | A | * | 6/1971 | Lakeman | 65/400 |
| 3,912,362 | A | * | 10/1975 | Hudson | 385/54 |
| 5,067,792 | A | * | 11/1991 | Lloyd | 385/115 |
| 6,584,259 | B2 | * | 6/2003 | Rubino, Jr. | 385/115 |
| 2002/0186940 | A1 | * | 12/2002 | Rubino | 385/115 |

* cited by examiner

Primary Examiner—Ricky L. Mack
(74) Attorney, Agent, or Firm—MacPherson-Kwok Chen & Heid LLP; Tom Chen

(57) ABSTRACT

A method of forming a field emission device and the resulting device including emitters formed of fiber segments. Tips are formed on the fiber segments that have a radius substantially small by exposing the tips to a reactive liquid for a duration of time The tips are coated with a low work function conducting material to form emitters.

22 Claims, 8 Drawing Sheets

FIBER BASED FIELD EMITTER DISPLAY

This application is a continuation-in-part of application Ser. No. 10/754,365, filed Jan. 8, 2004, and commonly owned, which is herein incorporated by reference for all purposes.

TECHNICAL FIELD

This invention generally relates to a field emission device, and more particularly to a method for forming a field emission device including electron emitting, conductor coated fiber tips.

BACKGROUND

Field emitting devices are generally found in a variety of applications, such as flat panel displays (FPDs), ion guns, electron beam lithography, high energy accelerators, free electron lasers, electron microscopes and the like. A typical field emitting device includes a cathode and a plurality of field emitter tips, a grid closely spaced to the emitter tips and an anode spaced further from the cathode. Voltage induces emission of electrons from the tips, through the grid, toward the anode.

FIG. 1 is a simplified illustration of a conventional triode-type field emission device 100 including an emitter 102 for emitting electrons, a gate electrode 104 for controlling the amount of electrons generated from emitter 102, and an anode 106 positioned above the gate electrode 104. A current is selectively applied to emitter 102 from the source electrode 108, which is dependent on the voltage applied to the gate electrode 110 of the transistor. A high voltage for discharging electrons from emitter 102 is applied to the gate electrode 104.

The cathode material characteristics are important in predicting performance. Cathode materials are typically metal, such as Mo and the like, or semiconductor, such as Si and the like. For metal and semiconductor materials, the control voltage required for emission is relatively high. The high control voltage increases damage due to ion bombardment and surface diffusion on the cathode tips and necessitates high power densities to produce the required emission current density. The fabrication of uniform sharp tips has been heretofore difficult, tedious and expensive, especially over a large area.

Another type of emitter is known as nanoscale conductors have recently emerged as potentially useful electron field emitters. Nanoscale conductors are tiny conductive nanotubes (hollow) or nanowires (solid). Typically, nanoscale conductors are grown in the form of randomly oriented, needle-like or spaghetti-like powders that are not easily or conveniently incorporated into a field emitter device. Due to this random configuration, the electron emission properties are not fully utilized or optimized. Many nanoscale conductor tips may be buried in the mass.

Consequently, there is a need for an improved method of forming emitters for use in field emission devices.

SUMMARY

The present invention provides a method for manufacturing emitters for field emission devices and a field emission device manufactured by such method for use in flat panel displays and the like.

In one aspect of the invention, a method is provided for forming a device including emitters. The formation of the device includes exposing one end of a plurality of bundled together fiber segments to a reactive liquid to allow the reactive liquid to react with the ends of the fiber segments to form an array of bundled together tips. A conductive material, generally a low work function material, is deposited on the array of tips. A dielectric layer is deposited on the array of coated array tips on which a patterned gate electrode is formed. Portions of the dielectric layer are removed to expose at least a portion of coated tips from the array of coated tips.

In another aspect of the invention a field emission device is provided which includes a cathode plate and an anode plate. The cathode plate is formed by exposing one end of a plurality of bundled together fiber segments to a reactive liquid to allow the reactive liquid to react with the ends of the fiber segments to form an array of bundled together tips; depositing a conductive material on the array of tips; depositing a dielectric layer on the coated array of tips; forming a gate electrode on the dielectric layer; and removing a portion of the dielectric layer to expose at least a portion of coated tips.

The anode plate is formed by providing a transparent substrate having a transparent conductive material deposited thereon; forming a dielectric spacer on the transparent substrate; and etching selective areas of the dielectric spacer to form chambers for containing color phosphors. The anode plate and the cathode plate are formed together to align the etched selective areas with the exposed coated tips to form emitter cells.

The emitter cells can be pumped to vacuum and sealed. The resulting field emission device can be used along with well know control electronics to form a field emission device based flat panel display.

The process of manufacturing field emitters in accordance with the present invention is easier than typical emitter manufacturing processes, because the process is simple and uncomplicated. The process of the present invention does not require individually patterning any structures for the formation of the emitters.

Further, the process of manufacturing emitters in accordance with the present invention provides better tip control. Beneficially, the tips can be made with a tip radius of less than 1 $\mu$m. The substantially small radius tips that can be formed using the method of the present invention allow electrons to be emitted at lower operating voltages than when using conventional manufacturing methods.

No clean room or other specialized equipment is necessary in the manufacturing process. Moreover, the process of the present invention is especially suited for the manufacture of large single piece, field emitters, such as field emitters on the order of 70 in.×70 in. or even larger sizes.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
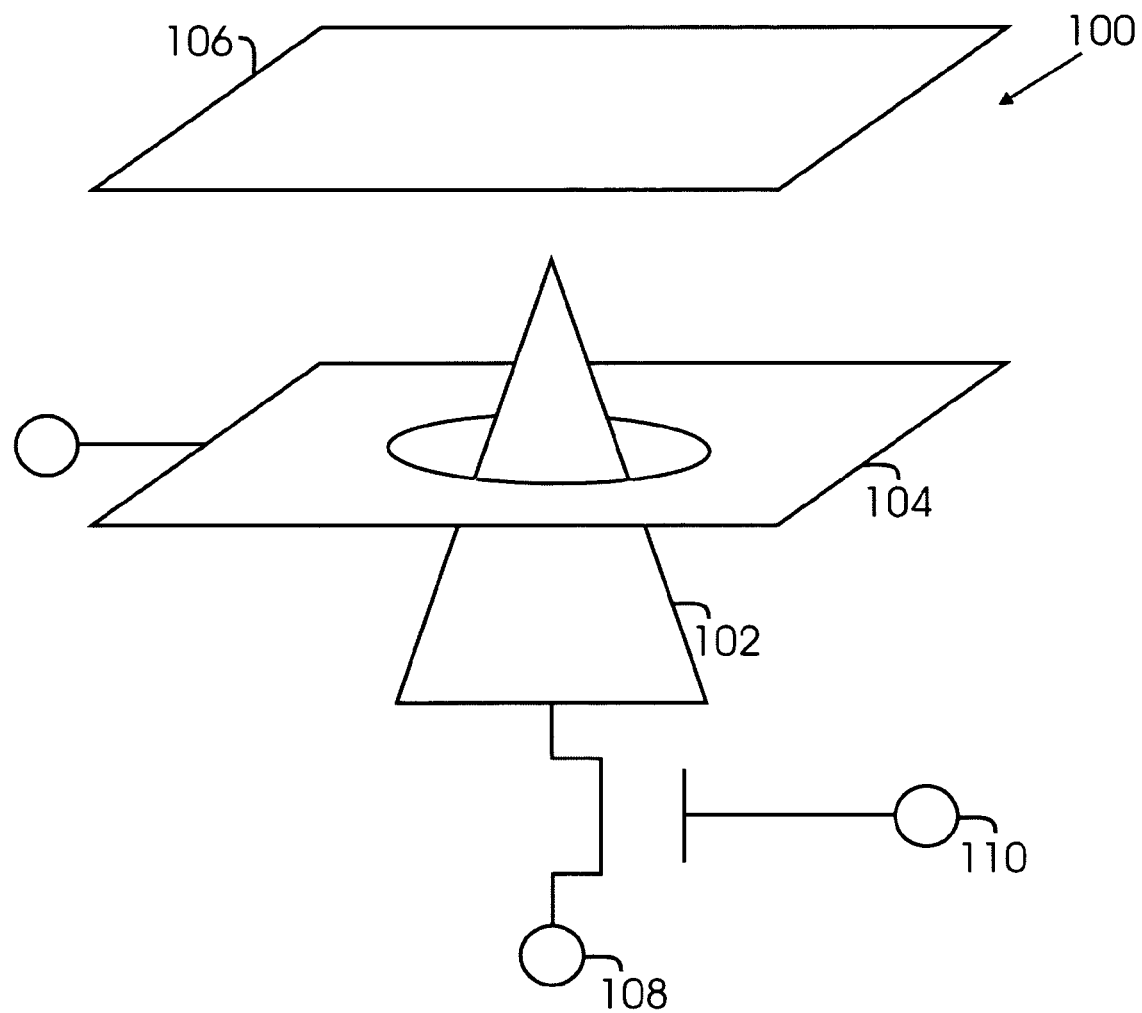
FIG. 1 is a simplified illustration of a typical field emission device.
Figure 2:
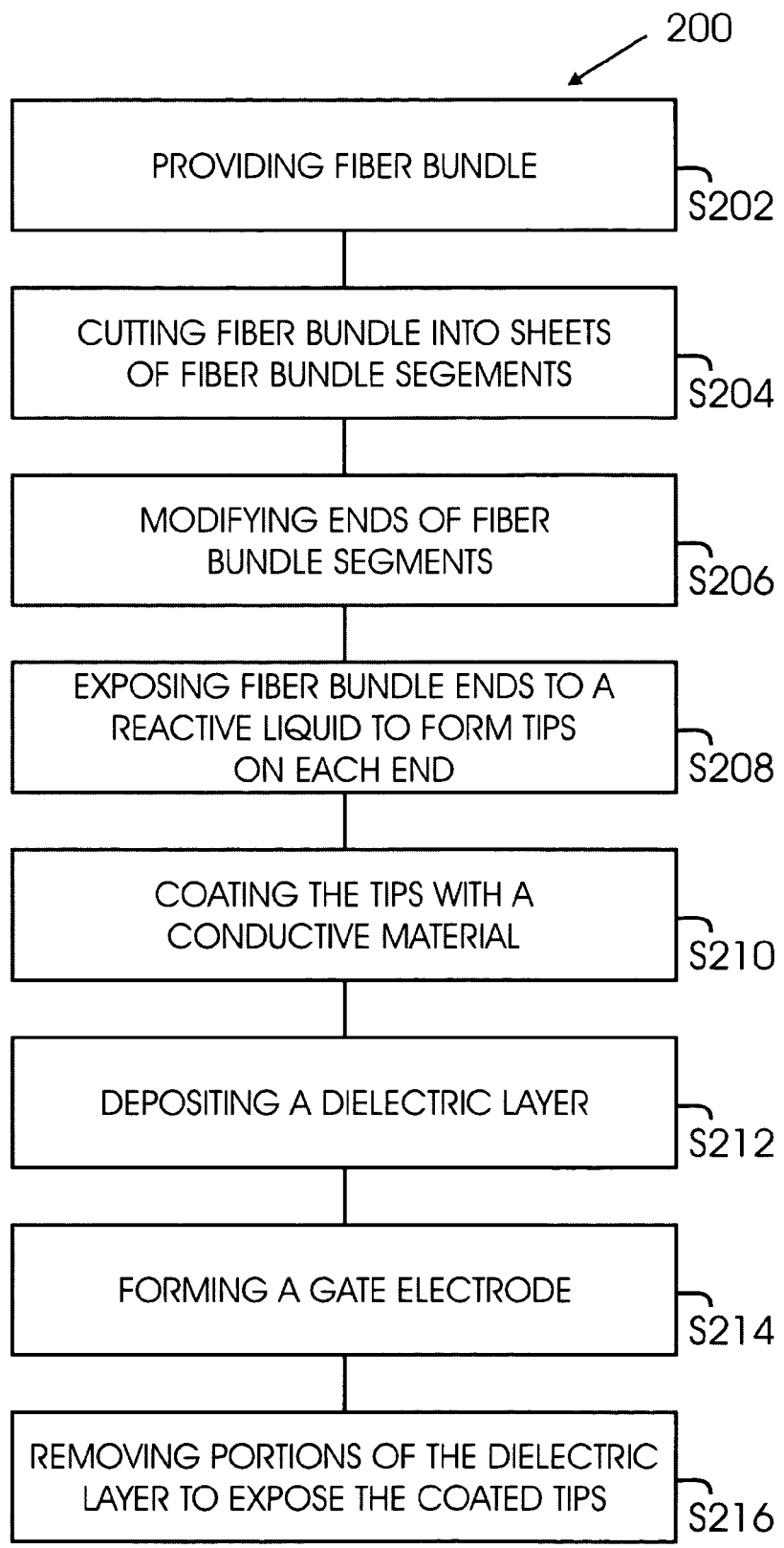
FIG. 2 is a flowchart illustrating a process for forming an emitter array in accordance with an embodiment of the presents invention.

FIG. 2 is a flowchart illustrating a process 200 for forming a cathode plate portion of an emitter array in accordance with an embodiment of the present invention. Process 200 includes forming or otherwise providing a bundle of cylindrical members, such as cylindrical rods or fibers made of glass ($SiO_2$), plastic and the like (s202). The bundle of cylindrical members is cut or sliced into a sheet or sheets of cylindrical member segments (s204), where each sheet has a first face and second face.

The ends of each cylindrical member segments in each sheet can be polished so as to create a smooth end (s206). In one embodiment, process 200 may also include modifying one or both faces of the sheets to form the face of the sheet into a surface that varies from a flat surface to a more rounded or curved surface.

The ends of each member segment in the sheet are etched to form tips (s208). A face of each sheet of cylindrical member segments is subjected to a reactive liquid, in the form of a liquid bath or a liquid spray. In one embodiment, the sheet of cylindrical member segments is at least partially immersed into the liquid bath, which includes an etching liquid. In another embodiment, a suitable etching liquid is sprayed on the sheet of cylindrical member segments. As described in greater detail below, the etching liquid provides for the formation of the tip on each member segment. In addition, the array of tipped member segments can be coated (s210) with a metallic/conductive layer to form the cathode electrode with integrated field emission (FE) tips.

As described in greater detail below, the FE tips can be covered with a protective layer of a dielectric material (s212). A gate electrode can then be deposited and patterned on the dielectric layer (s214). Accordingly, a portion of the FE tips are then exposed in selected areas using the gate electrode as an etch mask (i.e. self aligned etching) (s216). Those FE tips that are exposed are emitters in accordance with the present invention.

Figure 3:
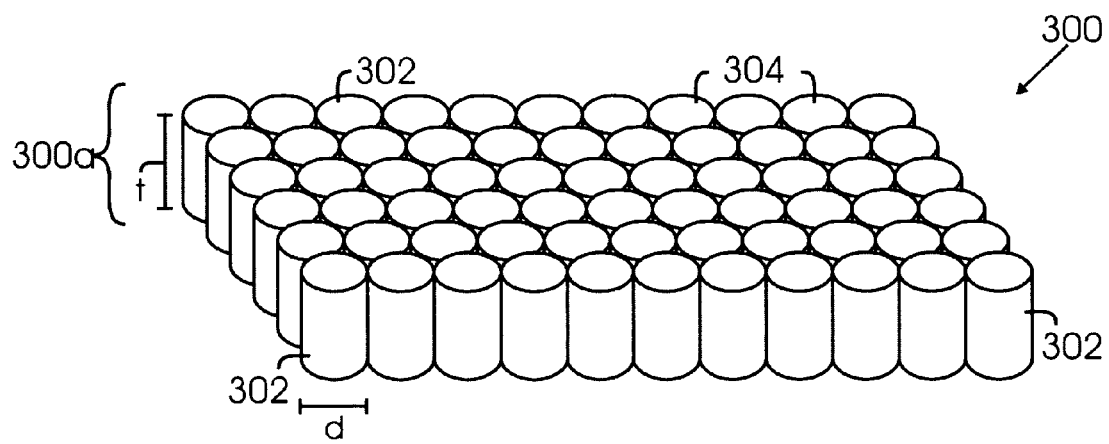
FIG. 3 is a simplified illustration of a sheet of cylindrical members in accordance with an embodiment of the present invention.

FIG. 3 is a simplified illustration of a bundle 300 of a plurality of cylindrical members 302 in accordance with an embodiment of the present invention. In one embodiment, each cylindrical member 302 can be a rod, cylinder, fiber or other similarly shaped member. Alternatively, the cylindrical member can have a non-circular cross-section, for example, a square or other polygonal cross-section.

The plurality of cylindrical members 302 is bound together along a longitudinal axis of each member. In one embodiment, a cross-section of the bundle of cylindrical members 302 can have a honey-comb like configuration. In other embodiments, the cross-section of the bundle of fibers may have a square, rectangular or other suitable cross-sectional configuration.

In one embodiment, cylindrical members 302 can be bound together to form bundle 300 using any suitable adhesive, such as a UV curable adhesive and the like. Beneficially, when using a UV curable adhesive, to form bundle 300 of cylindrical members 302, any gaps that may exist between the members are filled with the adhesive before the adhesive is cured.

The diameter and length of each cylindrical member 302 that make up bundle 300 are generally dictated by the application.

As shown in FIG. 3, to ensure the proper thickness, bundle 300 can be cut into a single layer or sheet 300a to form an array of cylindrical member segments 302 having a thickness t. In one embodiment, with no intent to limit the invention, the thickness of each sheet 300a of cylindrical member segments 302 can be between about 100 $\mu$m and several millimeters. Bundle 300 can be cut into sheet 300a using conventional cutting technologies, such as dicing saws and cutting wheels.

In one embodiment, the diameter d of each cylindrical member segment 302 in sheet 300a can be standard single mode fiber, which has a core size of about 9 $\mu$m and an overall diameter of about 125 $\mu$m. In general, the diameter of each cylindrical member 302 can range from between about less than 1 mm and about several millimeters depending on the application. In another embodiment, cylindrical member segment 302 can be multi-mode fiber.

Figure 4A:
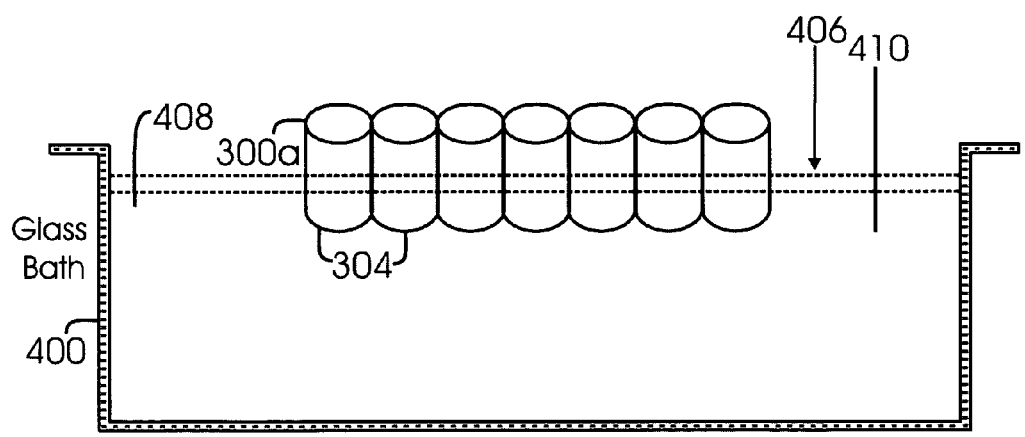
FIG. 4A is a simplified illustration of an etching bath in accordance with an embodiment of the present invention.
Figure 4B:
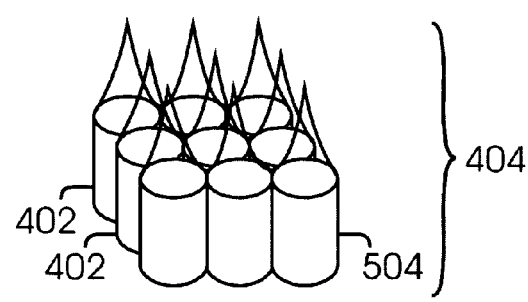
FIG. 4B is a simplified illustration of an array of emitters in accordance with an embodiment of the present invention.

As shown in FIGS. 4A and 4B, an end or face 304 of sheet 300a of cylindrical member segments 302 may be modified using an etching process in accordance with an embodiment of the present invention. Referring to FIG. 4A, in one embodiment, the modification can be accomplished by placing ends 304 of sheet 300a into a liquid bath container 400, which includes a liquid bath 406. Liquid bath 406 can include any desired formulation of chemicals suited for etching fibers. In one embodiment, liquid bath 406 includes an HF acid 408. A thin layer of oil can be added to liquid bath 406, which forms an oil film 410 on the surface of HF acid 408. The addition of the oil film 410 on the surface of the HF acid 408 creates a barrier on the acid surface to control the depth of the etch. Generally, the depth of the etch is controlled by the depth of the immersion of ends 304, however, the HF acid can in some instances "climb up" the member segments passed that portion which is immersed in the HF acid, causing the unwanted etching of the non-immersed portions. Oil film 410 prevents the HF acid from being able to climb beyond the oil film.

Ends 304 of sheet 300a are placed in liquid bath 406 for a specific duration of time long enough to perform the desired amount of etching. The time desired for etching is a function of the material of each member segment 302 of sheet 300a and the composition and concentration of liquid bath 406.

Figure 5:
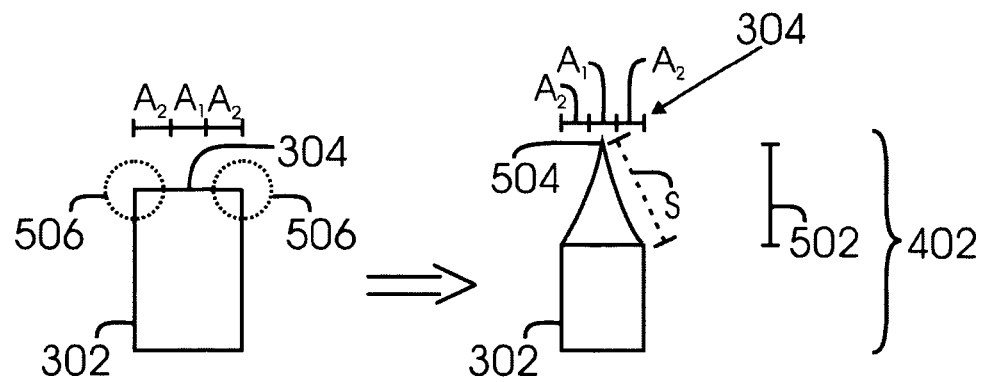
FIG. 5 is a simplified illustration of an individual member segment before and after being subjected to an etch process in accordance with an embodiment of the present invention.

In one embodiment, shown in FIG. 5, each member segment 302 of sheet 300a (a single member segment 302 is shown for clarity) includes a core area $A_1$ and a peripheral area $A_2$ surrounding core area $A_1$. In operation, liquid bath 406 affects peripheral area $A_2$ before it affects core area $A_1$, since the peripheral area $A_1$ is in direct contact and has more exposed surface area to HF acid 408. This is especially true at the corner areas 506, since the top and side of the corner areas are simultaneously exposed. The type of fiber being used to form the member segments also can affect how the etched area is formed. The core area $A_2$ of some fibers is made more pure than the peripheral area $A_1$, thus, the less pure area is more susceptible to the etching liquid. The longer cylindrical member segment 302 is held in liquid bath 406, the steeper the slope S of the etched area and the sharper the tip 502.

The length of tip 502 is controlled by the depth of immersion of member segments 302 into HF acid 408 below oil film 410. The sharpness or radius of the end tip 504 of tip 502, however, is controlled by the length of time that member segments 302 are held in liquid bath 406.

For example, in one embodiment, a sheet 300a having member segments 302 each with a core diameter of about 9 $\mu$m and an external diameter of 125 $\mu$m is placed in liquid bath 406, including pure HF acid 408 with oil film 410, at a depth of about 10 mm, for about 2 hours. The resulting emitter structure 402 can have an end tip 504 having a radius of well below 1 $\mu$m. Beneficially, the etch process of the present invention is a slow enough process that the manufacturer can continually check the progress of the etching process, and can remove sheet 300a from the etch bath at any time that the desired size of end tip 504 has been formed.

Referring again to FIG. 4B, the structure resulting from the etching process is an array 404 of emitters 402. The size of array 404 is limited only to the size of the originally provided bundle of fibers, and thus array 404 can be designed to substantially any array size.

Figure 6A:
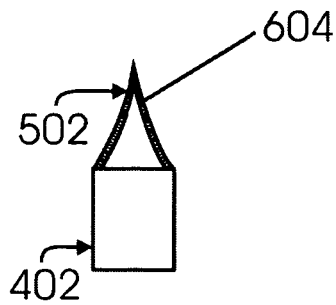
FIGS. 6A and 6B are simplified illustration of a coated emitter and a coated emitter array, respectively, in accordance with an embodiment of the present invention.
Figure 6B:
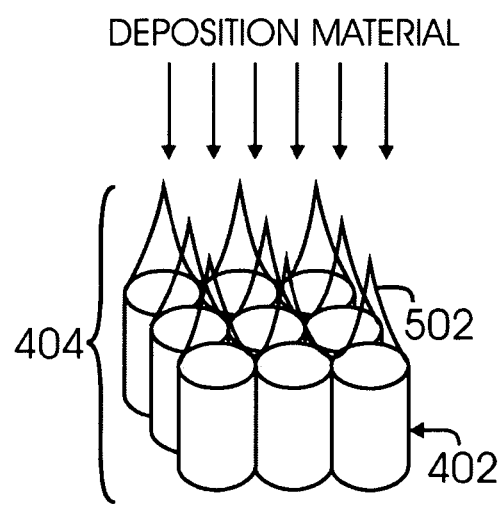

As shown in FIGS. 6A and 6B, the resulting emitter array 404 can be subjected to well known deposition techniques, such as evaporation, sputtering and the like, to deposit a conductive coating 604 on each emitter tip 502.

Conductive coating 604 can be any suitable coating that provides the necessary functionality for a particular application. In one embodiment, tips 502 are coated with a low work function metal/conductor coat 604, such as Mo, Ni, Cr, Cu, Au, Pt, Ir, Pd, Ti, Al, W, $\alpha$-C and the like. Using the low work function coating 604 means that a low voltage bias is able to draw electrons out of the conductive end tip 504. The sharp tip combined with the low work function coating provide for a low cost and energy efficient capability for emitting electrons.

FIGS. 7A–7D illustrate a process of completing the formation of cathode plate 700. After coating emitter array 404, a dielectric layer 702 is formed on emitter array 404. Dielectric layer 702 can be any suitable dielectric material, such as a polymer, spin-on-glass (SOG), $SiO_2$, $Si_3N_4$ and the like. Dielectric layer 702 can be deposited on emitter array 404 to fill in the spaces between coated emitter tips 502 using well known deposition, spin-on or spray techniques.

Figure 7A:
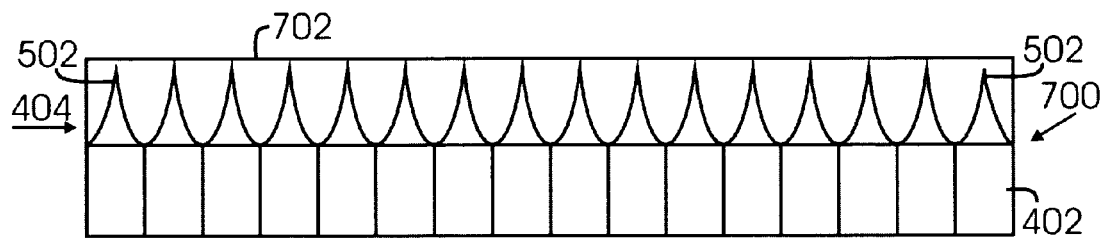
FIGS. 7A–7D are simplified illustrations of a process of forming a cathode plate in accordance with an embodiment of the present invention.
Figure 7B:
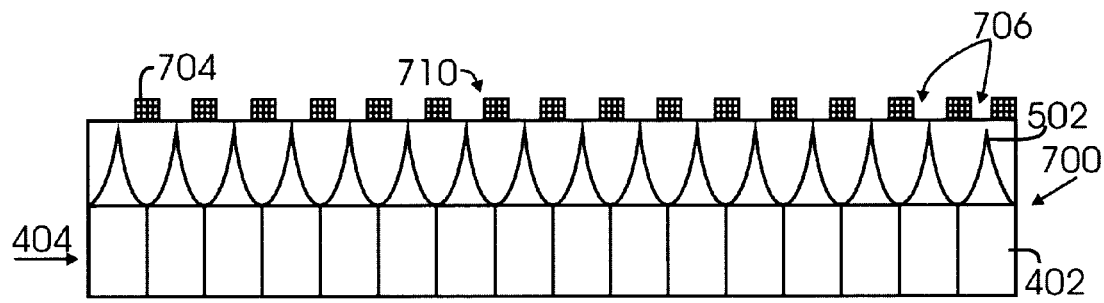

As shown in FIG. 7B, a gate electrode 704 is deposited on dielectric layer 702. Gate electrode 704 is patterned and etched. In one embodiment, gate electrode 704 is patterned on dielectric layer 702, such that the gate electrode is formed about rows of emitter tips 502, thus forming a single row of emitters positioned within an emitter cell 710.

Figure 7C:
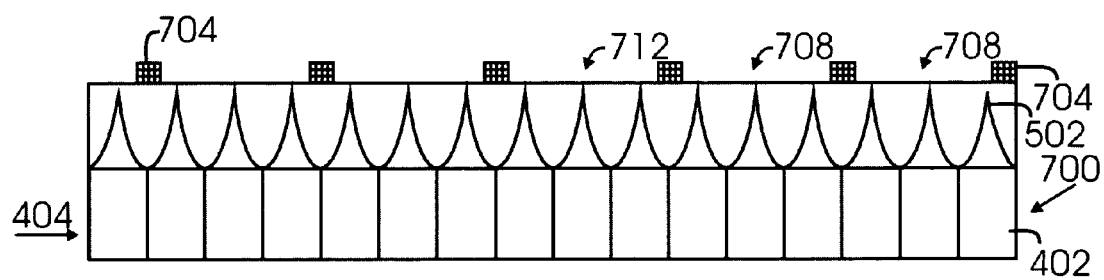
Figure 7D:
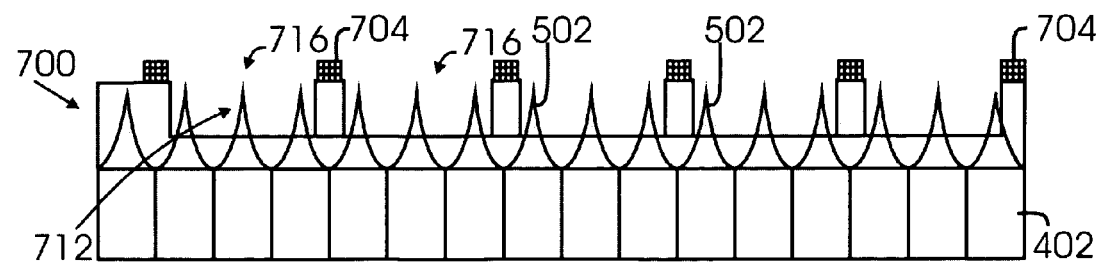

In an alternative embodiment, shown in FIG. 7C, gate electrode 704 is deposited on dielectric 702, patterned and etched. In this alternative embodiment, gate electrode 704 is patterned on dielectric layer 702, such that gate electrode 704 is formed about a plurality of emitter tips 502, thus allowing a plurality of rows of emitters to be positioned within a cell 712. Any number of rows of emitters 402 can be positioned within the cell 712, bounded only by the desired application.

In one embodiment, gate electrode 704 provides a self-aligned etch mask to allow for the removal of dielectric material 702 to form exposed areas 716 which allows desired emitter tips 502 to be exposed from beneath the dielectric material. The depth of material removal in exposed area 716 is such that at least end tips 504 are not covered by dielectric material.

Figure 8:
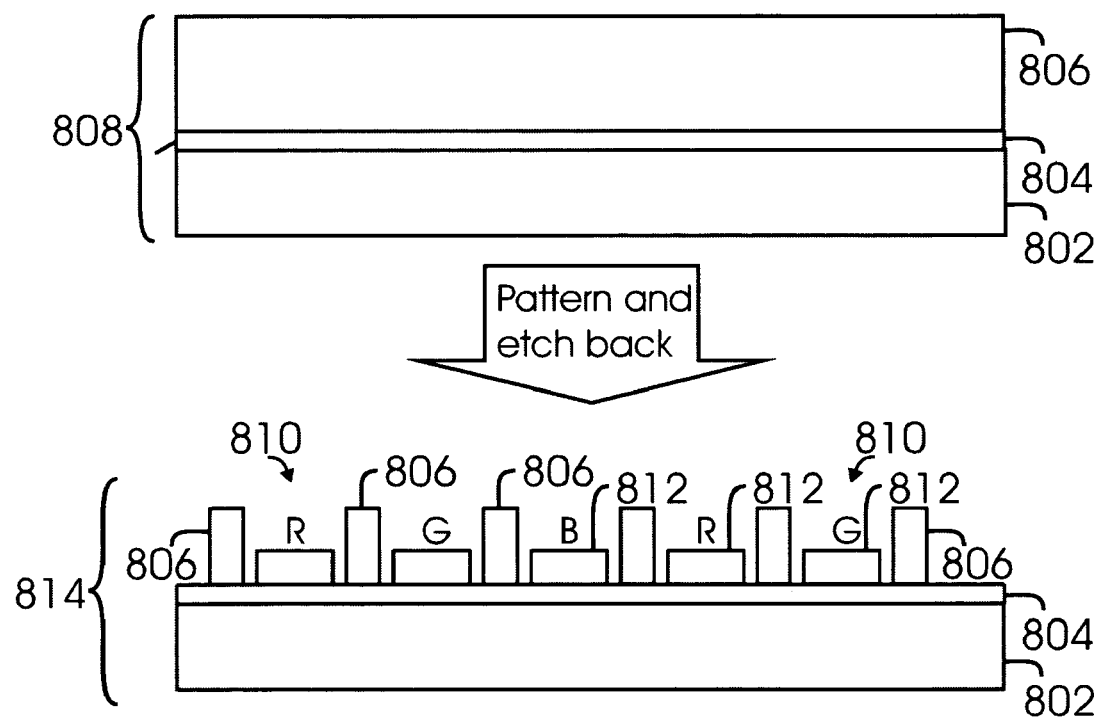
FIG. 8 is a simplified illustration of an anode structure formed by a lithographic patterning having chambers formed to contain RGB colored phosphors in accordance with an embodiment of the present invention.

FIG. 8 illustrates the formation of an anode plate in accordance with an embodiment of the present invention. The formation of the anode plate includes providing a clean glass substrate 802. A transparent conducting material 804, such as Indium Tin Oxide (ITO) and the like, is deposited and patterned, if desired, on glass substrate 802. Next, a suitable dielectric spacer 806, such as $SiO_2$, SOG, polymers and the like, is deposited over transparent conducting material 804. Dielectric spacer 806 can be deposited using various deposition techniques, such as evaporation, sputtering, CVD and the like.

The resulting structure 808 can then be patterned using, for example, optical lithography techniques or other similar patterning techniques. In one embodiment, the pattern is formed to match the pattern of the FE tip 502 arrays in cells 712 created as shown, for example, in FIG. 7D.

Selective areas of dielectric spacer 806 are etched back forming chambers 810. Each chamber 810 can then be filled with colored phosphors 812. Phosphors 812 include red, green and blue (RGB) color phosphors. The resulting anode plate 814 can then be combined with the cathode plate as described below.

Figure 9:
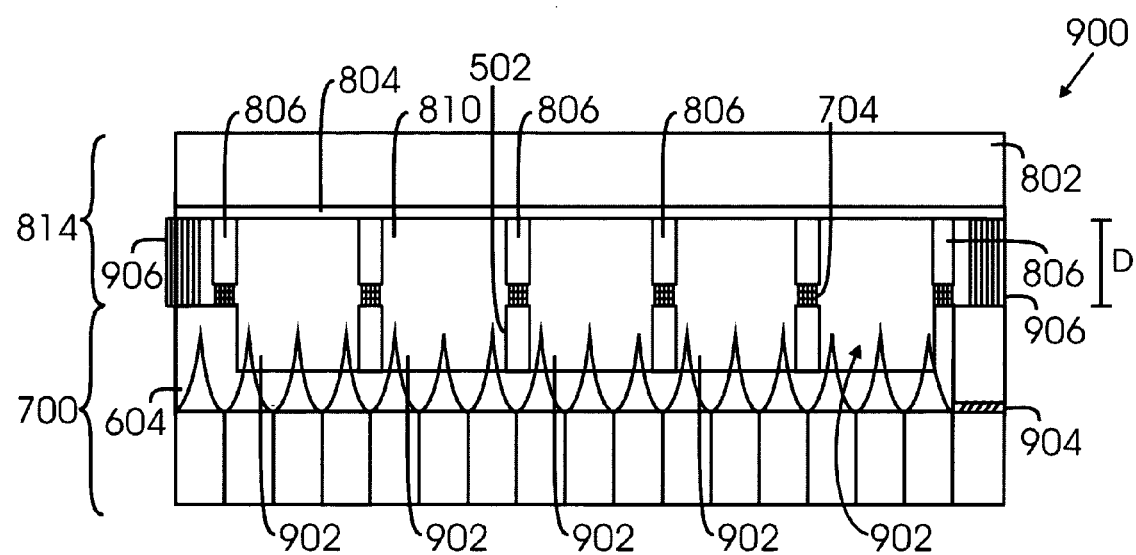
FIG. 9 is a simplified illustration of a field emission device in accordance with an embodiment of the present invention.

FIG. 9 shows an embodiment of a field emission device (FED) 900 in accordance with an embodiment of the present invention. Once having formed cathode plate 700 and anode plate 814, the two plates can be aligned. The remaining, unetched portions of dielectric spacer 806 are placed upon gate electrodes 704, such that each phosphor containing chamber 810 on anode plate 814 corresponds to exposed area 716 on cathode plate 700, thus forming emitter cells 902. A cathode contact point 904 is formed and positioned, such that contact point 904 contacts coating 604 of emitter tip 502, bringing all the coated emitter tips 502 into electrical contact.

A seal or gasket 906 is positioned between anode plate 814 and cathode plate 700 to be able to seal emitter cells 902. Thereafter, emitter cells 902 are pumped into vacuum and sealed.

In this configuration, electrons emitted from exposed emitter tips 502 can be accelerated to strike the RGB phosphors in chambers 810 to provide a colored light emission.

Figure 10:
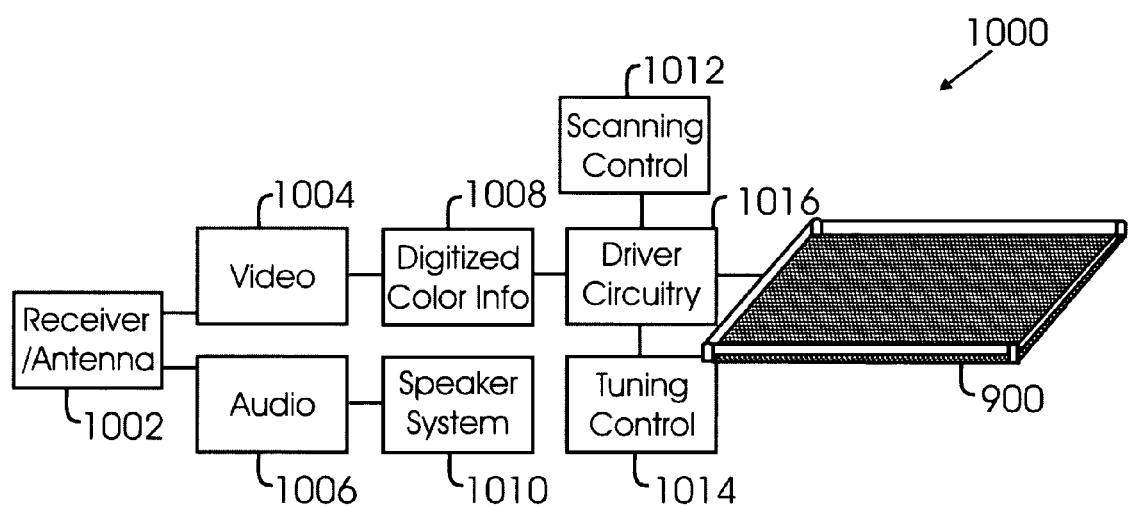
FIG. 10 is a schematic illustration of a system using the FED of FIG. 9 in accordance with an embodiment of the present invention.

FIG. 10 is a schematic illustration of a substantially complete display system employing FED 900. Various control electronics can be added to FED 900, such as a receiver/antenna 1002, video control 1004, audio control 1006, digitized color information 1008, a speaker system 1010,

What is claimed is:

1. A method of forming a device including emitters comprising:
   exposing one end of a plurality of bundled together fiber segments to a reactive liquid to allow said reactive liquid to react with said ends of said fiber segments to form an array of bundled together tips;
   depositing a conductive material on said array of tips;
   depositing a dielectric layer on said array of tips;
   forming a gate electrode on said dielectric layer; and
   removing a portion of said dielectric layer to expose at least a portion of coated tips from the array of tips.

2. The method of claim 1, wherein said reactive liquid comprises a bath of HF acid.

3. The method of claim 1, wherein said reactive liquid comprises a spray of HF Acid.

4. The method of claim 1, wherein said bundled together fiber segments comprise a sheet of fiber segments.

5. The method of claim 1, wherein said conductive material comprises a low work function conductor taken from the group consisting of Mo, Ni, Cr, Cu, Au, Pt, Ir, Pd, Ti, Al, W, $\alpha$-C and combinations thereof.

6. The method of claim 1, wherein said tips each have a tip radius of less than 1 $\mu$m.

7. The method of claim 1, further comprising:
   providing a transparent substrate having a transparent conductive material deposited thereon;
   forming a dielectric spacer on said transparent substrate;
   etching selective areas of said dielectric spacer to form chambers for containing color phosphors; and
   aligning said etched selective areas with said exposed coated tips to form a tip cell array structure.

8. The method of claim 7, wherein the transparent conductive material comprises a patterned transparent conductive material.

9. The method of claim 7, further comprising:
   sealing said tip cell array structure after pumping said tip cell structure into vacuum.

10. A field emission device comprising:
    a cathode plate formed by:
       exposing one end of a plurality of bundled together fiber segments to a reactive liquid to allow said reactive liquid to react with said ends of said fiber segments to form an array of bundled together tips;
       depositing a conductive material on said array of tips;
       depositing a dielectric layer on said coated array of tips;
       forming a gate electrode on said dielectric layer; and
       removing a portion of said dielectric layer to expose at least a portion of said coated tips from said array of coated tips; and
    an anode plate formed by:
       providing a transparent substrate having a transparent conductive material deposited thereon;
       forming a dielectric spacer on said transparent substrate; and
       etching selective areas of said dielectric spacer to form chambers for containing color phosphors;
    said anode plate and said cathode plate formed together to align said etched selective areas with said exposed coated tips to form a tip cell array structure.

11. The field emission device of claim 10, wherein said tip cell array structure comprises a seal to allow said tip cell array structure to be pumped into vacuum.

12. The field emission device of claim 10, wherein said reactive liquid comprises a bath of HF acid.

13. The field emission device of claim 10, wherein said reactive liquid comprises a spray of HF Acid.

14. The field emission device of claim 10, wherein said bundled together fiber segments comprise a sheet of fiber segments.

15. The field emission device of claim 10, wherein said conductive material comprises a low work function conductor taken from the group consisting of Mo, Ni, Cr, Cu, Au, Pt, Ir, Pd, Ti, Al, W, $\alpha$-C and combinations thereof.

16. The field emission device of claim 10, wherein said tips each have a tip radius of less than 1 $\mu$m.

17. The field emission device of claim 10, wherein the transparent conductive material comprises a patterned transparent conductive material.

18. A method of forming a device including emitters comprising:
    providing a sheet of fiber segments, each fiber segment having a first end;
    exposing said first ends of said fiber segments to a reactive liquid to allow said reactive liquid to react with said first ends to form a tip at each first end;
    depositing a conductive material on said tips;
    depositing a dielectric layer on said coated tips;
    forming a gate electrode on said dielectric layer; and
    removing a portion of said dielectric layer to expose at least a portion of coated tips;
    providing an anode plate including chambers containing color phosphors; and
    aligning said chambers with said exposed coated tips to form emitter cells.

19. The method of claim 18, wherein said reactive liquid comprises a bath of HF acid.

20. The method of claim 18, wherein said reactive liquid comprises a spray of HF Acid.

21. The method of claim 18, wherein said conductive material comprises a low work function conductor taken from the group consisting of Mo, Ni, Cr, Cu, Au, Pt, Ir, Pd, Ti, Al, W, $\alpha$-C and combinations thereof.

22. The method of claim 18, wherein said tips each have a tip radius of less than 1 $\mu$m.

* * * * *